United States Patent [19]

Yamazaki

[11] Patent Number: 4,525,435
[45] Date of Patent: Jun. 25, 1985

[54] LIGHT ENERGY CONVERSION SYSTEM

[75] Inventor: Shunpei Yamazaki, Tokyo, Japan

[73] Assignee: Semiconductor Energy Laboratory Co., Ltd., Japan

[21] Appl. No.: 479,559

[22] Filed: Mar. 28, 1983

[30] Foreign Application Priority Data

Mar. 29, 1982 [JP] Japan .................................. 57-50533

[51] Int. Cl.³ .............................................. H01M 6/36
[52] U.S. Cl. ................................... 429/111; 204/263; 204/275
[58] Field of Search ................ 429/111; 204/257, 263, 204/275, 129

[56] References Cited

U.S. PATENT DOCUMENTS

| | | | |
|---|---|---|---|
| 4,021,323 | 5/1977 | Kilby et al. | 204/129 |
| 4,128,704 | 12/1978 | McKinzie et al. | 429/111 |
| 4,381,233 | 4/1983 | Adachi et al. | 204/242 |
| 4,388,482 | 6/1983 | Hamakawa et al. | 136/258 AM |

OTHER PUBLICATIONS

R. Williams, "Schottky Barriers at the Interface Between Amorphous Silicon & Electrolytes", *J. Appl. Phys.*, vol. 50, pp. 2848–2851, (1979).

J. Manassen et al., "Electrochemical, Solid State, Photochemical, & Technological Aspects of Photoelectrochemical Energy Converters", *Nature*, vol. 263, pp. 97–100, (1976).

A. J. Nozik, "Photochemical Diodes", *Appl. Phys. Lett.*, vol. 30, pp. 567–569, (1977).

M. S. Wrighton, "Photochemistry", *Chemical & Eng. News*, Sep. 3, 1979, p. 37.

M. Eisenberg et al., "Photo-Electrochemical Cells", *Electrochimica Acta*, vol. 5, pp. 1–12, (1961).

Primary Examiner—Aaron Weisstuch
Attorney, Agent, or Firm—Murray, Whisenhunt & Ferguson

[57] ABSTRACT

First and second semiconductor photoelectric conversion structures, each having a PIN junction, are assembled as a unitary structure with a redox reaction chamber. Heavily doped N and P type semiconductor layers of the first and second semiconductor photoelectric conversion layers, respectively, are held in contact with first and second electrolytic solutions contained in first and second cells of the redox reaction chamber. By interconnecting third and fourth electrodes connected to the P and N type semiconductor layers of the first and second semiconductor photoelectric conversion structures, respectively, the electrolytic solutions in the first and second cells are transformed into electrolytic solutions having chemical energy converted from electrical energy derived from the conversion light energy by semiconductor photoelectric conversion structures.

Furthermore, electric power may be outputted across first and second electrodes held in contact with the first and second electrolytic solutions, respectively.

13 Claims, 5 Drawing Figures

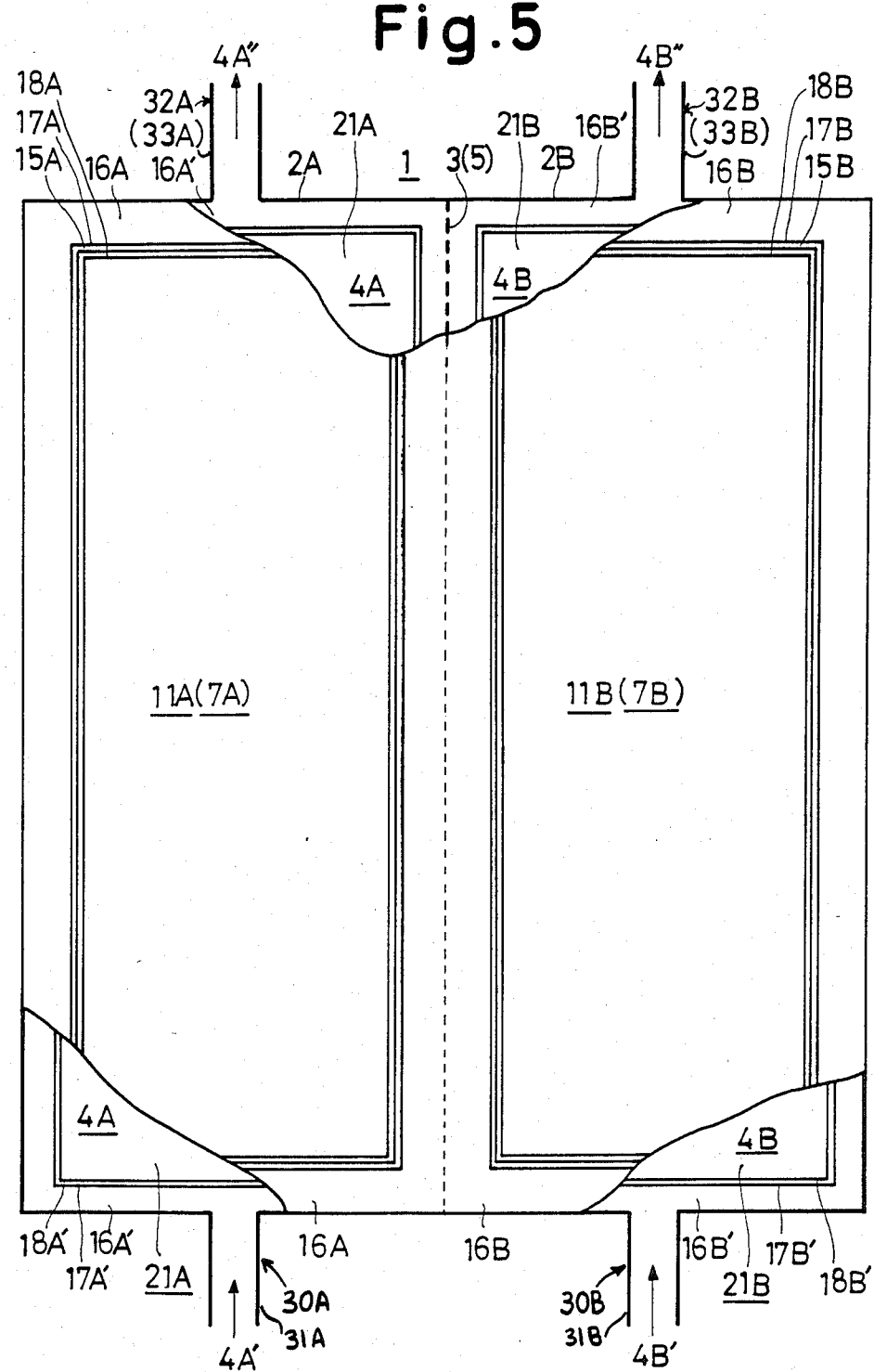

LIGHT ENERGY CONVERSION SYSTEM

BACKGROUND OF THE INVENTION

1. Field of the Invention

The present invention relates to a light energy conversion system and, more particularly, to a light energy conversion system which converts light energy into electrical energy, then converts it into chemical energy through the use of a redox reaction system, and finally reconverts the chemical energy into electrical energy through the redox reaction system.

2. Description of the Prior Art

Heretofore there have been proposed various light energy conversion systems of this type, which are usually provided with a semiconductor photoelectric conversion structure for converting light energy into electrical energy, a redox reaction system for converting the electrical energy obtained from the semiconductor photoelectric conversion structure into chemical energy and then converting the chemical energy into the electrical energy, first and second electrodes held in contact with the aqueous solution in the redox reaction system, and first and second connecting means for electrically interconnecting a pair of electrodes of the semiconductor photoelectric conversion structure and the first and second electrodes of the redox reaction system.

Such prior art light energy conversion systems are bulky as a whole because the photoelectric conversion semiconductor structure and the redox reaction system are provided separately of each other.

Furthermore, the conventional systems require first and second electrodes for the redox reaction system and necessitate, as means for electrically interconnecting the semiconductor photoelectric conversion structure and the redox reaction system, two electric connecting means for use in converting the electrical energy into chemical energy and two electric connecting means for use in reconverting the chemical energy into electrical energy. Accordingly, the prior art light energy conversion systems are disadvantageous in that they involve the use of a large number of parts and require much time for electrically interconnecting the electrode of the semiconductor photoelectric conversion structure and the electrode held in contact with the electrolytic solution of the redox reaction system.

SUMMARY OF THE INVENTION

It is therefore an object of the present invention to provide a novel light energy conversion system which is free from the abovesaid defects of the prior art.

Briefly stated, the light energy conversion system of the present invention comprises a redox reaction chamber provided with first and second cells intercommunicating through an ion bridge and respectively containing first and second electrolytic solutions; a first semiconductor photoelectric conversion structure having a P type first semiconductor layer, an I type (intrinsic) second semiconductor layer formed on the first semiconductor layer and a heavily doped N type third semiconductor layer formed on the second semiconductor layer and held in contact with the first electrolytic solution in the first cell of the redox reaction chamber on the side opposite that facing the second semiconductor layer; a second semiconductor photoelectric conversion structure having an N type fourth semiconductor layer, an I type (intrinsic) fifth semiconductor layer formed on the fourth semiconductor layer and a heavily doped P type sixth semiconductor layer formed on the fifth sem layer and held in contact with the second electrolytic solution in the second cell of the redox reaction chamber on the side opposite that facing the fifth semiconductor layer; a first electrode contacting the first electrolytic solution contained in the first cell of the redox reaction chamber; a second electrode contacting the second electrolytic solution contained in the second cell of the redox reaction chamber and paired with the first electrode; a third electrode connected to the first semiconductor layer of the first photoelectric conversion semiconductor structure; a fourth electrode connected to the fourth semiconductor layer of the second photoelectric conversion semiconductor structure and paired with the third electrode; and means for electrically interconnecting the third and fourth electrodes.

According to the light energy conversion system of the present invention, when the first and second semiconductor photoelectric conversion structures are exposed to irradiation by light, electric current is generated between (a) the third semiconductor layer of the first semiconductor photoelectric conversion structure and the third electrode on the side of the third semiconductor layer (negative pole) and (b) between the sixth semiconductor layer of the second semiconductor photoelectric conversion structure and the fourth electrode on the side of the sixth semiconductor layer (positive pole). The third and sixth semiconductor layers of the first and second semiconductor photoelectric conversion structures make contact with the first and second electrolytic solutions respectively contained in the first and second cells of the redox reaction chamber. The abovesaid third and sixth semiconductor layers pair each other.

Accordingly, by electrically connecting the third and fourth electrodes through electric connection means, a cathodic reduction reaction occurs in the first cell of the redox reaction chamber and, in the second cell, an anodic oxidation reaction occurs.

As a result of this, electrical energy available from the semiconductor photoelectric conversion structure by dint of photoelectric conversion can be converted by the first and second electrolytic solutions in the first and second cells into chemical energy and stored therein.

Furthermore, according to the light energy conversion system of the present invention, the first and second electrodes make contact with the first and second electrolytic solutions contained in the first and second cells of the redox reaction chamber.

Accordingly, by connecting a load between the first and second electrodes, the aforesaid second and first redox reactions occur on the sides of the first and second cells, respectively.

In this case, chemical energy stored in the first and second electrolytic solutions in the first and second cells can be supplied to the load after being converted into electrical energy.

In this way, the light energy conversion system of the present invention converts light energy into electrical energy, converts the electrical energy into chemical energy, and then reconverts the chemical energy into electrical energy.

According to the light energy conversion system of the present invention, the first and second semiconductor photoelectric conversion structures and the redox reaction chamber are assembled together as a unitary structure, with the third and sixth semiconductor layers of the first and second photoelectric conversion semiconductor structures held in contact with the first and second electrolytic solutions contained in the first and second cells of the redox reaction chamber. Therefore, the light energy conversion system of the present invention can be made compact as compared with the aforementioned conventional light energy conversion systems.

Besides, according to the light energy conversion system of the present invention, since the third and sixth semiconductor layers of the first and second semiconductor photoelectric conversion structures are held in contact with the first and second electrolytic solutions in the first and second cells of the redox reaction chamber, the electrodes which are held in contact with the electrolytic solution contained in the redox reaction chamber are only the first and second electrodes which make contact with the first and second electrolytic solutions in the first and second cells of the redox reaction chamber. Moreover, the electric connecting means for the semiconductor photoelectric conversion structures may simply be means for electrically connecting the third and fourth electrodes. Accordingly, as compared with the prior art systems, the system of the present invention has the advantages that the number of parts used is small and that the electrical connections of the semiconductor photoelectric conversion structures are less troublesome and time-consuming.

Other objects, features and advantages of the present invention will become more fully apparent from the following description taken in conjunction with the accompanying drawings.

BRIEF DESCRIPTION OF THE DRAWINGS

FIG. 5 is a schematic plan view, partly cut away, illustrating fourth, fifth, and sixth embodiments of the light energy conversion system of the present invention.

DESCRIPTION OF THE PREFERRED EMBODIMENTS

Figure 1:
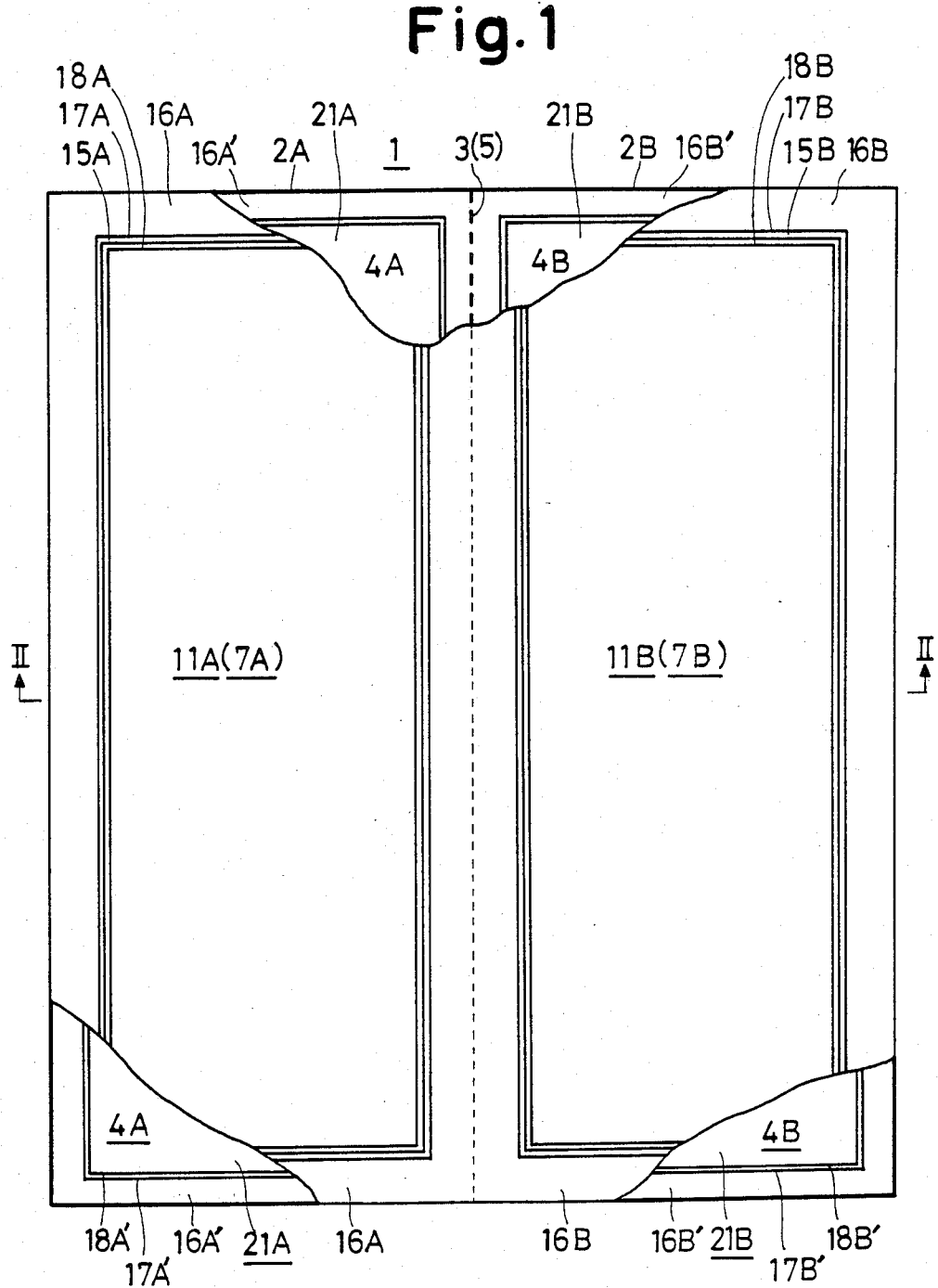
FIG. 1 is a schematic plan view, partly cut away, illustrating a first embodiment of the light energy conversion system of the present invention.
Figure 2:
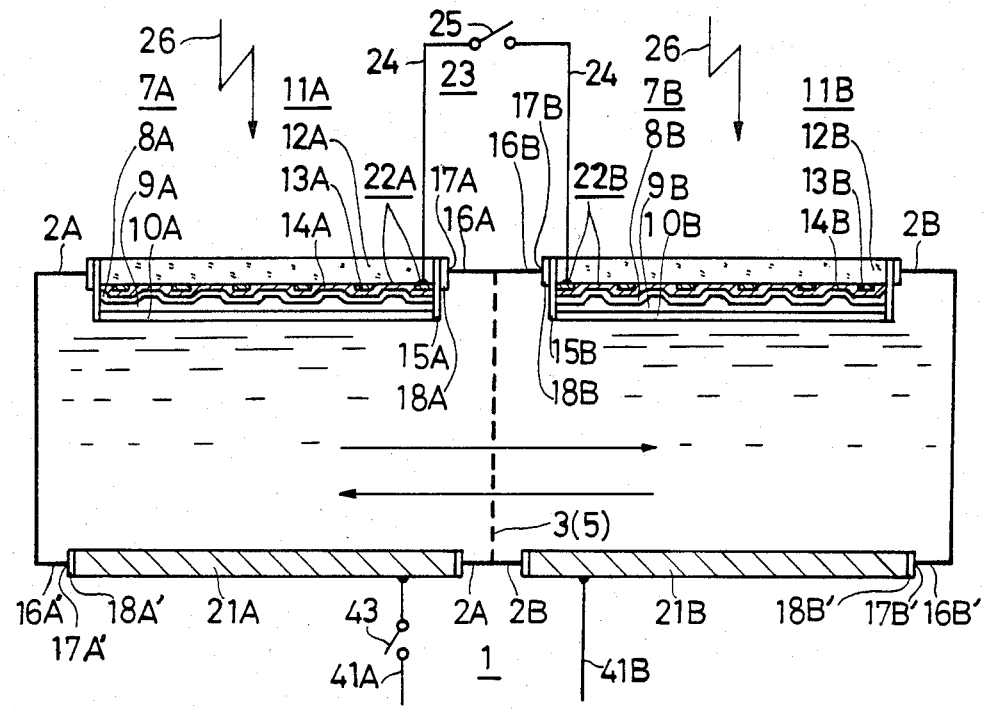
FIG. 2 is a sectional view taken on the line II—II in FIG. 1.

FIGS. 1 and 2 illustrate a first embodiment of the light energy conversion system of the present invention, which is provided with a redox reaction chamber 1.

The reaction chamber 1 comprises first and second cells 2A and 2B, which intercommunicate through an ion bridge 3 and have introduced thereinto first and second electrolytic solutions 4A and 4B, respectively.

The ion bridge 3 is formed by a known ion exchange membrane 5.

As the electrolytic solutions 4A and 4B contained in the first and second cells 2A and 2B, there can be employed various known electrolytic solutions which are used in redox reaction systems.

For example, the following electrolytic solution can be used, which employs a nonaqueous solvent such as acetonitrile expressed by $$CH_3CN \tag{1}$$

or propylene carbonate expressed by $$CH_3-CH-CH_2 \atop \underset{O}{\overset{O}{\diagdown}}\underset{\|}{C}\underset{O}{\diagup} \tag{2}$$

The electrolyte used is a complex salt including a dipyridyl, expressed by 2,2'-dipyridyl [$(C_5H_4N)_2$]  (3a)

4,4'-$(CH_3)_2$ dipyridyl  (3b)

$(NH_3)_4$ dipyridyl  (3c)

or 5,5'-$(CH_3)_2$ dipyridyl  (3d)

or a phenanthroline, expressed by 1,10 (or ortho) phenanthroline  (4a)

4,7-$(C_6H_4SO_3)_2$ phenanthroline  (4b)

4,7-$(CH_3)_2$ phenanthroline  (4c)

or 5,6-$(CH_3)_2$ phenanthroline  (4d)

and metal ion.

The metal ion may be titanium (Ti), vanadium (V), chromium (Cr), manganese (Mn), cobalt (Co), nickel (Ni) or copper (Cu) ion, but it is preferable to employ iron (Fe), ruthenium (Ru) or osmium (Os) ion.

The electrolyte of the electrolytic solution may preferably be a complex salt which includes the following dipyridyl or phenanthroline compound and the metal ion.

Fe(dipyridy)$_3X_2$  (5a)

Fe(phenanthroline)$_3X_2$  (5b)

Ru(dipyridyl)$_3X_2$  (6a)

Ru(phenanthroline)$_3X_2$  (6b)

Os(dipyridyl)$_3X_2$  (7a)

Os(phenanthroline)$_3X_2$  (7b)

where X is a chlorine peroxide radical expressed by $(ClO_4)^{2-}$.

According to this electrolytic solution, in the case where the electrolyte is a complex salt of dipyridyl or phenanthroline (identified by R) with a metal ion, which is iron (Fe), ruthenium (Ru) or osmium (Os) ion (metals of such metal ions being identified by M), there are caused an anodic oxidation reaction (injection of electrons from the electrolytic solution into an electrode) expressed by the following anodic oxidation reaction formula (8a) or (9a) and a cathodic reduction reaction (injection of electrons from an electrode into the electrolytic solution) expressed by the following cathodic reduction reaction formula (8b) or (9b) (e⁻ being an electron):

$$M(R)_3{}^{2+} \rightarrow M(dipyridyl)_3{}^{3+} + e^-  \quad (8a)$$

$$M(R)_3{}^{3+} + e^- \rightarrow M(dipyridyl)_3{}^{2+} \quad (8b)$$

$$M(R)_3{}^+ \rightarrow M(dipyridyl)_3{}^{2+} + e^- \quad (9a)$$

$$M(R)_3{}^{2+} + e^- M(dipyridyl)_3{}^+ \quad (9b)$$

According to this electrolytic solution, since the solvent is acetonitrile or propylene carbonate and since the electrolyte is a complex salt of dipyridyl or phenanthroline with a metal ion, the electrolyte can be dissolved in the solvent in as large a quantity as 0.5 mol % or more.

In the case where the solvent is acetonitrile and the electrolyte is a complex salt of dipyridyl with the iron ion, the electrolyte can be dissolved in the solvent in an amount of 2 mol % at room temperature, 4 mol % at 50° C. and 5 mol % at 70° C.

Also, in the case where the solvent is acetonitrile and the electrolyte is a complex salt of phenanthroline with iron, ruthenium, or osmium ions, where the solvent is propylene carbonate and the electrolyte is a complex salt of dipyridyl with iron, ruthenium, or osmium ions, or where the solvent is propylene carbonate and the electrolyte is a complex salt of phenanthroline with iron, ruthenium, or osmium ions, a large quantity of the electrolyte can similarly be dissolved in the solvent as in the case where the solvent is acetonitrile and the electrolyte is a complex salt or dipyridyl with iron ions.

Furthermore, this electrolytic solution permits dissolution of a large amount of electrolyte in the solvent, and hence has a high degree of electric conductivity.

In the case where the solvent is acetonitrile, the electrolyte is a complex salt or dipyridyl with iron ions and is dissolved in the solvent in an amount of 2 mol % at room temperature, 4 mol % at 50° C. and 5 mol % at 70° C., respectively, as described above, the electrolytic solutions have electric conductivities as high as $5 \times 10^{-2}$ $(\Omega cm)^{-1}$ at room temperature, 3 to $7 \times 10^{-1}$ $(\Omega cm)^{-1}$ at 50° C., and 1 to 5 $(\Omega cm)^{-1}$ at 70° C., respectively.

Also in the case where the solvent is acetonitrile and the electrolyte is a complex salt of phenanthroline with iron, ruthenium, or osmium ions, where the solvent is propylene carbonate and the electrolyte is a complex salt of dipyridyl with iron, ruthenium, or osmium ions, or where the solvent is propylene carbonate and the electrolyte is a complex salt of phenanthroline with iron, ruthenium, or osmium ions, the electrolytic solution similarly has as high a degree of conductivity as in the case where the solvent is acetonitrile and the electrolyte is a complex salt of dipyridyl with iron ions.

The first embodiment of the light energy conversion system of the present invention is provided with first and second semiconductor photoelectric conversion structures 7A and 7B in addition to the abovesaid redox reaction chamber 1.

The semiconductor photoelectric conversion structure 7A comprises a P type first semiconductor layer 8A, an I type second semiconductor layer 9A formed on the first semiconductor layer 8A, and an N type third semiconductor layer 10A formed on the second semiconductor layer 9A.

The first semiconductor photoelectric conversion structure 7A is formed, in practice, by a known CVD, reduced pressure CVD, or plasma CVD method on a light transparent conductive substrate 11A. In this case, the light transparent conductive substrate 11A has a light transparent insulating substrate proper 12A, a comb-shaped lead-out electrode 13A formed on the light transparent conductive substrate 11A and a light transparent conductive film 14A formed on the light transparent conductive substrate 11A to cover the lead-out electrode 13A.

The second semiconductor photoelectric conversion structure 7B comprises an N type fourth semiconductor layer 8B, an I type fifth semiconductor layer 9B formed on the fourth semiconductor layer 8B and a P type sixth semiconductor layer 10B formed on the fifth semiconductor layer 9B.

The second semiconductor photoelectric conversion structure 7B is also formed, in practice, by a known CVD, reduced pressure CVD, or plasma CVD method on a light transparent conductive substrate 11B. In this case, the light transparent conductive substrate 11B has a light transparent insulating substrate proper 12B, a comb-shaped lead-out electrode 13B formed on the light transparent conductive substrate 11B and a light transparent conductive film 14B formed on the light transparent conductive substrate 11B to cover the lead-out electrode 13B.

In this case, the light transparent insulating substrates 12A and 12B may be formed of glass. The light transparent conductive films 14A and 14B may each be a combination of indium oxide and tin oxide, and the lead-out electrodes 13A and 13B may be formed of aluminum.

The lead-out electrode 13A and the light transparent conductive film 14A constitute a first electrode 22A described later. Similarly, the lead-out electrode 13B and the light transparent conductive film 14B constitute a second electrode 22B described later.

In the case where the semiconductor photoelectric conversion structures 7A and 7B are formed by the aforementioned method, the semiconductor layers 8A, 8B, 9A, 9B, 10A, and 10B are each formed of a non-single crystal semiconductor, in particular an amorphous semiconductor, a semi-amorphous semiconductor containing microcrystals having a particle size on the order of 5 to 100 Å or a microcrystalline or polycrystalline semiconductor.

The non-single-crystal semiconductor forming the semiconductor layers 8A, 8B, 9A, 9B, 10A, and 10B may be non-single-crystal silicon (Si), germanium silicide, silicon nitride ($Si_3N_{4-x}$ ($0 < x < 4$)), or silicon carbide ($Si_xC_{1-x}$ ($0 < x < 1$)). In particular, since the semiconductor layers 8A and 8B are on the side on which light is incident, the non-single crystal semiconductor forming the layers 8A and 8B may preferably be silicon nitride ($Si_3N_{4-x}$) or silicon carbide ($Si_xC_{1-x}$) having a relatively wide band gap energy Eg of 1.8 to 2.5 eV as will be appreciated from the following description. It is also preferable, however, to employ for forming the semiconductor layers 8A and 8B amorphous or semi-amorphous silicon having a band gap energy Eg of 1.6 to 1.9 eV for the reason that in the case of the incident light being sunlight, its light absorption coefficient in the short wavelength region from 3500 to 5000 Å is 10 to 30 times larger than that of the single crystal silicon. The semiconductor layers 8A and 8B can be formed as thin as 50 to 500 Å.

For the reason given above with respect to the semiconductor layers 8A and 8B it is preferable that the non-single crystal semiconductor forming the semiconductor layers 9A and 8B be amorphous or semi-amorphous silicon. The semiconductor layers 9A and 9B can be formed to a thickness of 0.5 to 1 μm, in particular, 0.5 μm.

The non-single crystal semiconductor forming the semiconductor layers 10A and 10B may preferably be amorphous or semi-amorphous $Si_3N_{4-x}$ ($0<x<4$) or $Si_xC_{1-x}$ ($0<x<1$), in particular, amorphous or semi-amorphous $Si_3N_{4-x}$ ($x=3.5$ to $3.95$) or $Si_xC_{1-x}$ ($x=0.2$ to $0.7$) having a band gap energy Eg in the range of 1.8 to 2.8 eV because it is desirable that the semiconductor layers 10A and 10B be highly resistant (i.e., inert) to redox reaction between them and the electrolytic solutions 4A and 4B contained in the cells 2A and 2B described later. The semiconductor layers 10A and 10B can be made as thin as 50 to 500 Å.

The semiconductor layer 10A has N type conductivity, and hence contains an N type impurity. As the N type impurity, there can be used Group V-A elements but it is preferable to employ antimony (Sb), arsenic (As), or phosphrous (P) on the ground that the semiconductor layer 10A can obtain a relatively high electric conductivity of $10^{-5}$ to $10^{-6}$ $(\Omega\cdot cm)^{-1}$ with a relatively small amount of N type impurity. In the case where the semiconductor layer 10A contains the N type impurity Sb, As, or P, its content can be selected to be 0.01 to 3 mol % with respect to the semiconductor forming the layer 10A.

The semiconductor layer 10B has P type conductivity and hence contains a P type impurity. As the P type impurity, there can be used Group III-A elements but it is preferable to employ indium (In), gallium (Ga), or aluminum (Al) because the semiconductor layer 10B can obtain a relatively high electric conductivity with a relatively small amount of P type impurity and because even if the abovesaid elements are oxidized, they still remain conductive. In the case where the semiconductor layer 10B contains the P type impurity In, Ga, or Al, its content can be selected in the range of 0.01 to 3 mol % relative to the semiconductor forming the layer 10B.

The semiconductor photoelectric conversion structure 7A is disposed so that, of its semiconductor layers 8A, 9A and 10A, only the surface of the semiconductor layer 10A on the opposite side from the semiconductor layer 9A makes contact with the electrolytic solution 4A contained in the cell 2A, as described below.

The outer marginal edge of the semiconductor photoelectric conversion structure 7A is covered with a liquidtight insulating protective film 15A. Also, a window 17A is formed in the top wall 16A of the redox reaction chamber 1 on the side of the cell 2A.

The semiconductor photoelectric conversion structure 7A is disposed in the window 17A to close it, with the surface of the semiconductor layer 10A on the side opposite that facing the layer 9A held in contact with the electrolytic solution 4A contained in the cell 2A, the semiconductor structure 7A being fixedly attached to the window 17A through an adhesive binder 18A applied between the insulating protective film 15A and the inside of the window 17A. The photoelectric conversion semiconductor structure 7A forms a part of the top wall 16A of the cell 2A of the redox reaction chamber 1.

The semiconductor photoelectric conversion structure 7B is disposed so that, of its semiconductor layers 8B, 9B and 10B, only the surface of the semiconductor layer 10B on the side opposite that facing the semiconductor layer 9B makes contact with the electrolytic solution 4B contained in the cell 2B, as described below.

The outer marginal edge of the semiconductor photoelectric conversion structure 7B is covered with a liquidtight insulating protective film 15B. On the other hand, a window 17B is formed in the top wall 16B of the redox reaction chamber 1 on the side of the cell 2B.

The semiconductor photoelectric conversion structure 7B is disposed in the window 17B to close it, with the surface of the semiconductor layer 10B on the opposite side from the layer 9B held in contact with the electrolytic solution 4B contained in the cell 2B, the semiconductor structure 7B being fixedly attached to the window 17B through an adhesive binder 18B applied between the insulating protective film 15B and the inside of the window 17B. The semiconductor photoelectric conversion structure 7B forms a part of the top wall 16B of the cell 2B of the redox reaction chamber 1.

The first embodiment of the light energy conversion system of the present invention has first and second electrodes 21A and 21B for contact with the electrolytic solutions 4A and 4B contained in the cells 2A and 2B. The electrodes 21A and 21B are, for example, plate-shaped.

The first electrode 21A is disposed in contact with the electrolytic solution 4A as follows:

A window 17A' is formed in the bottom wall 16A' of the redox reaction chamber 1 on the side of the cell 2A. The plate-shaped first electrode 21A is disposed in the window 17A' to close it, with one side of the electrode 21A held in contact with the electrolytic solution 4A, the electrode 21A being fixedly attached to the window 17A' through an adhesive binder 18A' applied between the electrode 21A and the inside of the window 17A'. The first electrode 21A forms a part of the bottom wall 16A' of the redox reaction chamber 1 on the side of the cell 2A.

In a similar manner, the second electrode 21B is disposed in contact with the electrolytic solution 4B as follows:

A window 17B' is formed in the bottom wall 16B' of the redox reaction chamber 1 on the side of the cell 2B. The plate-shaped second electrode 21B is disposed in the window 17B' to close it, with one side of the electrode 21B held in contact with the electrolytic solution 4B, the electrode 21B being fixedly attached to the window 17B' through an adhesive binder 18B' applied between the electrode 21B and the inside of the window 17B'. The second electrode 21B forms a part of the bottom wall 16B' of the redox reaction chamber 1 on the side of the cell 2B.

Furthermore, the first embodiment of the light energy conversion system of the present invention is provided with a pair of first and second electrodes 22A and 22B which are connected to the semiconductor layers 8A and 8B of the semiconductor photoelectric conversion structures 7A and 7B, respectively. The first electrode 22A is formed, for instance, by the lead-out electrode 13A and the light transparent conductive film 14A described previously. The second electrode 22B is similarly formed by the lead-out electrode 13B and the light transparent conductive film 14B.

The first embodiment of the light energy conversion system of the present invention is further provided with means 23 for electrically interconnecting the electrodes 22A and 22B.

The electric connecting means 23 has switch 25 inserted in lead wire 24 connected to the lead-out electrodes 13A and 13B forming the electrodes 22A and 22B, respectively.

The above is a description of the first embodiment of the light energy conversion system of the present invention.

With such an arrangement of the light energy conversion system of the present invention as described above, when light 26 is incident on the semiconductor photoelectric conversion structures 7A and 7B through the light transparent conductive substrates 11A and 11B, there is generated between the semiconductor layer 10A of the photoelectric conversion semiconductor structure 7A and the electrode 22A a negative electric potential on the side of the semiconductor layer 10A. Likewise, there is generated between the semiconductor layer 10B of the photoelectric conversion semiconductor structure 7B and the electrode 22B a positive electric. potential on the side of the semiconductor layer 10B.

The semiconductor layers 10A and 10B of the photoelectric conversion semiconductor structures 7A and 7B make contact with the electrolytic solutions 4A and 4B contained in the cells 2A and 2B of the redox reaction chamber 1, respectively.

Accordingly, by closing the switch 25 to electrically interconnect the electrodes 22A and 22B, a cathodic reduction reaction occurs on the side of the cell 2A of the redox reaction chamber 1 and, on the side of the cell 2B, an anodic oxidation reaction occurs.

That is to say, first and second ions of different electrical charge are present in the electrolytic solutions 4A and 4B contained in the cells 2A and 2B. This causes a cathodic reduction reaction on the side of the electrolytic solution 4A, in consequence of which the first ions become third ions of smaller charge than the first ions. On the side of the electrolytic solution 4B, an anodic oxidation reaction occurs and, as a result of this, the second ions become fourth ions of greater charge than the second ions. In this case, since the electrolytic solutions 4A and 4B communicate with each other, in terms of ions, through the ion bridge 3, an ion exchange takes place between the electrolytic solutions 4A and 4B so that the concentrations of the third and fourth ions respectively generated in the electrolytic solutions 4A and 4B are increased. Thus, the third and fourth ions are stored on the sides of the electrolytic solutions 4A and 4B, respectively.

In the case where the electrolytic solutions 4A and 4B are such as expressed by the aforementioned formulas (5a), (5b), (6a), (6b), (7a) and (7b), that is, expressed by $M(R_3)X_2$, the ions $M(R)_3{}^{3+}$ and $M(R)_3{}^{2+}$ (or $M(R)_3{}^{2+}$ and $M(R)_3{}^{+}$) shown on the left sides of the aforesaid formulas (8a) and (8b) are present as the first and second ions in the electrolytic solutions 4A and 4B before the cathodic reduction and anodic oxidation reactions are caused. Consequently, when electric current flows between the semiconductor layer 10A of the semiconductor photoelectric conversion structure 7A and the electrode 22A, making the side of the semiconductor layer 10A negative relative to the semiconductor layer 10B, the cathodic reduction reaction takes place on the side of the electrolytic solution 4A, in which the $M(R)_3{}^{3+}$ (or $M(R_3)^{2+}$) ions as the first ions become $M(dipyridyl)_3{}^{2+}$ (or $M(dipyridyl)_3{}^{+}$) as the third ions are stored. On the side of the electrolytic solution 4B, the anodic oxidation reaction takes place and the $M(R)_3{}^{2+}$ (or $M(R)_3{}^{+}$) ions as the second ion become $M(dipyridyl)_3{}^{3+}$ (or $M(dipyridyl)_3{}^{2+}$) as the fourth ions and are stored.

After storing the third and fourth ions in the electrolytic solutions contained in the cells 2A and 2B of the redox reaction chamber 1 as described above, the switch 25 forming the electric connecting means 23 is opened to disconnect the electrodes 22A and 22B from each other. If a load (not shown) is connected across the electrodes 21A and 21B via leads 41A and 41B respectively connected thereto via switch 43, then electric power can be supplied to the load. In this case, the third and fourth ions stored in the electrolytic solutions 4A and 4B gradually decrease, and the first and second ions in the electrolytic solutions 4A and 4B gradually increase correspondingly.

As described above, the first embodiment of the present invention exhibits conversion of light energy into electric energy, followed by conversion of the electric energy into chemical energy through the use of the redox reaction system, and then finally reconverts the chemical energy into electric energy through the use of the redox reaction system.

According to the first embodiment of the present invention, the semiconductor photoelectric conversion structures 7A and 7B and the redox reaction chamber 1 are assembled together into a unitary structure, with the semiconductor layers 10A and 10B held in contact with the electrolytic solutions 4A and 4B contained in the cells 2A and 2B of the redox reaction chamber 1. Accordingly, the light energy conversion system of this embodiment can be made compact as compared with the conventional light energy conversion systems.

Furthermore, according to the first embodiment of the present invention, since the semiconductor layers 10A and 10B of the semiconductor photoelectric conversion structures 7A and 7B are in contact with the electrolytic solutions 4A and 4B in the cells 2A and 2B of the redox reaction chamber 1, the only electrodes which are in contact with the electrolytic solution in the redox chamber are the electrodes 21A and 21B which make contact with the electrolytic solution 4A and 4B in the cell 2A and 2B of the redox reaction chamber 1 for supplying electrical energy to a load. Moreover, this embodiment is provided with one means 23 for electrically interconnecting the electrodes 22A and 22B when converting electrical energy into chemical energy and another means including leads 41A and 41B and a switch 43 for connecting the electrodes 21A and 21B to the load when converting chemical energy into electrical energy, but there is no need of providing electric connecting means which is connected with the semiconductor photoelectric conversion structure and the electrolytic solution contained in the redox reaction chamber.

Therefore, the first embodiment of the present invention is advantageous over the prior art systems in that the number of parts used is small and electrical connection of the semiconductor photoelectric conversion structure and the electrode contacting the electrolytic solution in the redox reaction chamber is less troublesome and time-consuming.

Next, a description will be given, with reference to FIG. 3, of a second embodiment of the present invention, in which the parts corresponding to those in FIG. 2 are identified by the same reference numerals.

Figure 3:
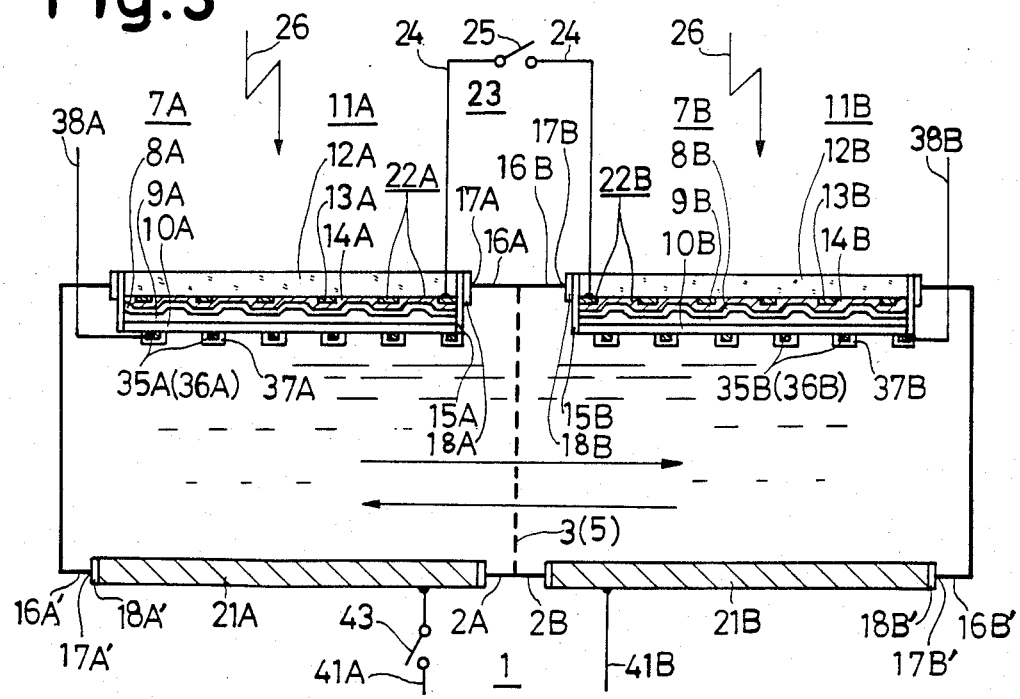
FIG. 3 is a sectional view schematically illustrating a second embodiment of the light energy conversion system of the present invention.

The second embodiment shown in FIG. 3 is identical in construction with the first embodiment of FIGS. 1 and 2 except for the provision of electrodes 35A and 35B which are connected with the semiconductor layers 10A and 10B of the semiconductor photoelectric conversion structures 7A and 7B and are paired with the electrodes 22A and 22B, respectively.

The electrodes 35A and 35B are formed, for example, by comb-shaped or grid-like conductive films 36A and 36B deposited on the semiconductor layers 10A and 10B. The conductive films 36A and 36B are respectively covered with protective films 37A and 37B so that they may not be eroded by the electrolytic solutions 4A and 4B contained in the cells 2A and 2B.

Accordingly, though not described in detail, the second embodiment illustrated in FIG. 3 also possesses the same excellent features as those obtainable with the first embodiment shown in FIGS. 1 and 2.

According to the second embodiment, when the switch 25 of the electric connecting means 23 is closed, electric power generated by the incidence of light 26 between the semiconductor layer 10A of the semiconductor photoelectric conversion structure 7A and the electrode 22A and between the semiconductor layer 10B of the semiconductor photoelectric conversion structure 7B and the electrode 22B can be obtained across the electrodes 35A and 35B.

Consequently, by means of output leads 38A and 38B connected to the electrodes 35A and 35B, respectively, it is possible to convert the electric energy produced in the semiconductor photoelectric conversion structures 7A and 7B by the redox reaction system into chemical energy while utilizing the electric power outside the system.

Next, a description will be given, with reference to FIG. 4, of a third embodiment of the present invention, in which the parts corresponding to those in FIG. 2 are identified by the same reference numerals.

Figure 4:
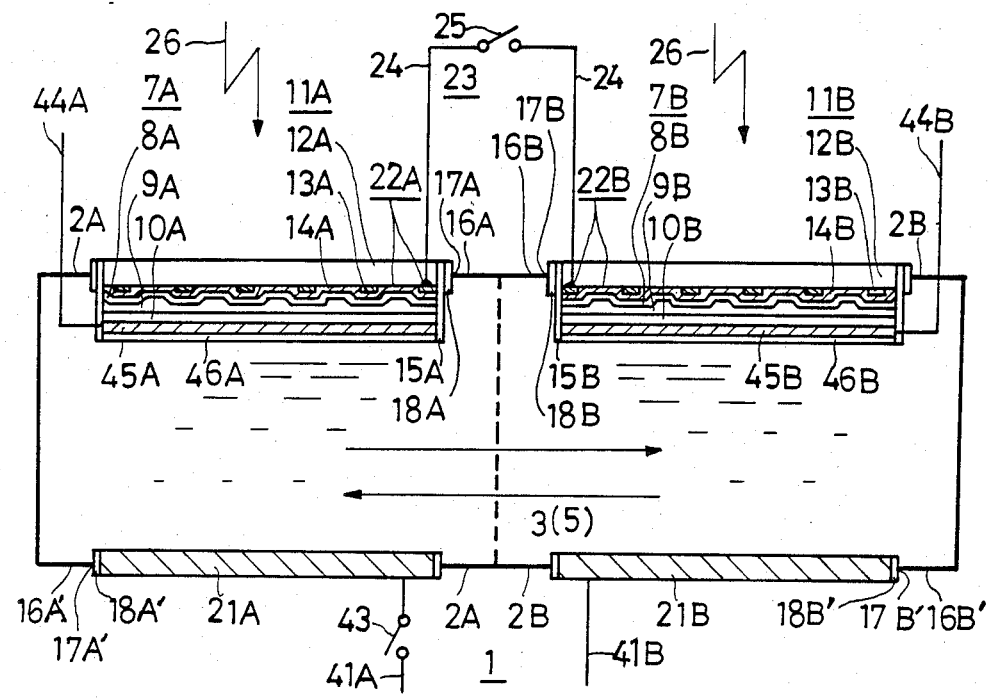
FIG. 4 is a sectional view schematically illustrating a third embodiment of the light energy conversion system of the present invention.

The third embodiment shown in FIG. 4 is identical in construction with the first embodiment of FIGS. 1 and 2 except that the semiconductor layers 10A and 10B of the photoelectric conversion semiconductor structures 7A and 7B are covered with metallic conductive layers 45A and 45B, which are, in turn, covered with N and P type semiconductor layers 46A and 46B of the same conductivity type as those of the semiconductor layers 10A and 10B.

Accordingly, in the third embodiment shown in FIG. 4, only the semiconductor layers 46A and 46B are in contact with the electrolytic solutions 4A and 4B contained in the cells 2A and 2B of the redox reaction chamber 1, instead of the semiconductor layers 10A and 10B of the semiconductor photoelectric conversion structures 7A and 7B in the first embodiment shown in FIGS. 1 and 2.

In this case, the metallic conductive layers 45A and 45B, each forming a part of one of the semiconductor photoelectric conversion structures 7A and 7B can be formed by a known CVD, reduced pressure CVD, or plasma CVD method or, in some cases, by a vacuum evaporation method.

Moreover, the semiconductor layers 46A and 46B of the semiconductor photoelectric conversion structures 7A and 7B are formed by the known CVD, reduced pressure CVD, or plasma CVD method, as is the case with the other semiconductor layers 8A, 8B, 9A, 9B, 10A and 10B.

In the case where the semiconductor layers 46A and 46B are formed by the abovesaid method, they are formed of a non-single crystal semiconductor, in particular, an amorphous or semi-amorphous semiconductor.

The semiconductor layers 46A and 46B make contact with the electrolytic solutions 4A and 4B in the cells 2A and 2B of the redox reaction chamber 1 and perform the redox reaction with the electrolytic solution as described previously with respect to FIGS. 1 and 2; therefore, it is desirable that the semiconductor layers 46A and 46B be highly resistant (i.e., inert) to the redox reaction. For this reason, it is preferable that the semiconductor layers 46A and 46B be formed of amorphous or semi-amorphous $Si_3N_{4-x}$ ($0 < x < 4$) or $Si_xC_{1-x}$ ($0 < x < 1$), in particular, amorphous or semi-amorphous $Si_3N_{4-x}$ ($x = 3.5$ to $3.95$) or $Si_xC_{1-x}$ ($x = 0.2$ to $0.7$) which has a band gap energy Eg in the range of 1.8 to 2.8 eV. The semiconductor layers 46A and 46B can be made as thin as 50 to 500 Å.

Besides, the semiconductor layers 10A and 10B do not make contact with the electrolytic solution 4A and 4B in the cells 2A and 2B of the redox reaction chamber 1, and hence they need not always be formed of the amorphous or semi-amorphous $Si_3N_{4-x}$ ($0 < x < 4$) or $Si_xC_{1-x}$ ($0 < x < 1$) as referred to previously with respect to FIGS. 1 and 2 but may be made of amorphous or semi-amorphous silicon.

The structure made up of the semiconductor layer 10A, the metallic conductive layer 45A and the semiconductor layer 46A forming the semiconductor photoelectric conversion structure 7A is equivalent, in terms of function, to the semiconductor layer 10A in the first embodiment described previously in connection with FIGS. 1 and 2.

Likewise, the structure made up of the semiconductor layer 10B, the metallic conductive layer 45B and the semiconductor layer 46A forming the semiconductor photoelectric conversion structure 7B is also equivalent, in terms of function, to the semiconductor layer 10B in the first embodiment of FIGS. 1 and 2.

Accordingly, though not described in detail, the third embodiment shown in FIG. 4 also has the same excellent features as those obtainable with the first embodiment of FIGS. 1 and 2.

With the third embodiment shown in FIG. 4, in the case where the switch 25 of the electric connecting means 23 is closed, electric power generated across the electrode 22A and the semiconductor layer 10A of the semiconductor photoelectric conversion structure 7A and across the electrode 22B and the semiconductor layer 10B of the semiconductor photoelectric conversion structure 7B can be obtained across the metallic conductive layers 45A and 45B.

Consequently, by leading out leads 44A and 44B from the metallic conductive layers 41A and 41B, respectively, it is possible to convert the electrical energy generated in the semiconductor photoelectric conversion structures 7A and 7B into chemical energy while at the same time utilizing the electric power outside the system.

Next, a description will be given, with reference to FIG. 5 of fourth, fifth and sixth embodiments of the present invention, in which the parts corresponding to those in FIG. 1 are identified by the same reference numerals.

The fourth, fifth and sixth embodiments of the present invention are identical in construction with the first, second and third embodiments shown in FIGS. 1 and 2 and 3, and 4, respectively, except for the provision of electrolytic solution inlet means 30A and 30B for introducing electrolytic solutions 4A' and 4B' into the cells 2A and 2B of the redox reaction chamber 1 from the outside and electrolytic solution outlet means 32A and 32B for leading out the electrolytic solutions 4A and 4B from the cells 2A and 2B to the outside so as to store them as electrolytic solutions 4A″ and 4B″ having chemical energy converted from electrical energy.

In the fourth, fifth, and sixth embodiments shown in FIG. 5, the electrolytic solution inlet means 30A and 30B include pipes 31A and 31B which are formed integrally with the redox reaction chamber 1 to extend outwardly thereof, for example, from the side panels of the cells 2A and 2B. The electrolytic solution outlet means 32A and 32B include pipes 33A and 33B extending outwardly from the other side panels of the cells 2A and 2B.

The above is a description of the fourth, fifth, and sixth embodiments of the present invention.

The fourth, fifth, and sixth embodiments of the present invention are identical in construction with the first, second, and third embodiments of FIGS. 1 and 2 and 3 and 4 except for the distinctions described above.

Accordingly, though not described in detail, the fourth, fifth, and sixth embodiments of FIG. 5 also possess the same excellent features as do the first, second, and third embodiments shown in FIGS. 1 and 2 and 3 and 4, respectively.

Furthermore, in the fourth, fifth, and sixth embodiments of the present invention, the electrolytic solutions 4A and 4B in the cells 2A and 2B of the redox reaction chamber 1 can be removed therefrom by the electrolytic solution outlet means 32A and 32B so that the electrolytic solutions 4A and 4B are stored outside the system, as the electrolytic solutions 4A″ and 4B″ having chemical energy converted from electrical energy. The electrolytic solution inlet means 31A and 31B supply the electrolytic solutions 4A′ and 4B′ into the cells 2A and 2B of the redox reaction chamber 1 to make up for the amounts of electrolytic solutions 4A″ and 4B″ stored outside the system.

Accordingly, the fourth, fifth, and sixth embodiments of FIG. 5 possess the advantage that the electrolytic solution having electrical energy converted into chemical energy can be stored outside the system in large quantities.

Incidentally, the foregoing embodiments should be construed as being merely illustrative of the present invention and it will be apparent that many modifications and variations may be affected without departing from the spirit of the present invention.

For example, in each of the above-described embodiments of the present invention, the semiconductor photoelectric conversion structures 7A and 7B may each be modified so that the single PIN junction formed by the semiconductor layers 8A to(10A, 8B to 10B) is replaced with two or more such PIN junctions. In this case, since electric power of higher voltage than in the aforedescribed embodiments can be generated in the semiconductor photoelectric conversion structures 7A and 7B, electrical energy can be converted into chemical energy with higher efficiency than in the embodiments described in the foregoing.

Moreover, in the foregoing embodiments of the present invention, it is also possible that the junctions between the semiconductor layers (8A and 9A, 8B and 9B) and between (9A and 10A, 9B and 10B) in the semiconductor photoelectric conversion structures, 7A and 7B are made gradual as disclosed in U.S. Pat. No. 4,239,554, and that the semiconductor layer (8A, 8B), on which the light 26 is incident, or the layers (8A and 9A, 8B and 9B) are formed as so-called graded band gap types which have a wider band gap energy $E_g$ than does the semiconductor layer (10A, 10B) on the opposite side from the side on which the light 26 is incident. In this case, a high photoelectric conversion efficiency can be obtained with the semiconductor photoelectric conversion structure 7.

I claim:
1. A light energy conversion system comprising;
 a redox reaction chamber provided with first and second cells intercommunicating through an ion bridge and containing first and second electrolytic solutions, respectively;
 a first semiconductor photoelectric conversion structure having a P type first non-single crystalline semiconductor layer, an I type second non-single crystalline semiconductor layer formed on the first non-single crystalline semiconductor layer, and a heavily doped, N type third non-single crystalline semiconductor layer formed on the second non-single crystalline semiconductor layer;
 a second semiconductor photoelectric conversion structure having an N type fourth non-single-crystalline semiconductor layer, an I type fifth non-single crystalline semiconductor layer formed on the fifth non-single-crystalline semiconductor layer, and a heavily doped, P type sixth non-single-crystalline semiconductor layer formed on the fifth non-single-crystalline semiconductor layer;
 a first electrode in contact with the first electrolytic solution contained in the first cell of the redox reaction chamber;
 a second electrode in contact with the second electrolytic solution contained in the second cell of the redox reaction chamber and paired with the first electrode;
 a third electrode connected with the first non-single-crystalline semiconductor layer of the first semiconductor photoelectric conversion structure;
 a fourth electrode connected with the fourth non-single-crystalline semiconductor layer of the second semiconductor photoelectric conversion structure and paired with the third electrode;
 means for electrically interconnecting the third and fourth electrodes; and
 means for connecting a load across the first and second electrodes to supply electric power to the load;
 wherein the first semiconductor photoelectric conversion structure is provided in the first cell (a) so that it forms a part of the first cell wall, (b) so that light is incident on the first semiconductor photoelectric conversion structure directly without passing through the first electrolytic solution in the first cell, and (c) so that only the portion of the semiconductor photoelectric conversion structure on the side of the third non-single-crystalline semiconductor layer is held in contact with the first electrolytic solution; and
 wherein the second semiconductor photoelectric conversion structure is provided in the second cell (a) so that it forms a part of the second cell wall, (b) so that light is incident on the second semiconductor photoelectric conversion structure directly without passing through the second electrolytic solution in the second cell, and (c) so that only the portion of the semiconductor photoelectric conversion structure on the side of the sixth non-sin- gle-crystalline semiconductor layer is held in contact with the second electrolytic solution.

2. A light energy conversion system according to claim 1 wherein the first and second semiconductor photoelectric conversion structures are disposed side by side on the side of the same wall of the redox reaction chamber.

3. A light energy conversion system according to claim 1 or 2 where the third and sixth non-single-crystalline semiconductor layers of the first and second semiconductor photoelectric conversion structures are formed of Si, gerinanium silicide, $Si_3N_{4-x}$ ($0<x<4$) or $Si_xC_{1-x}$ ($0<x<1$).

4. A light energy conversion system according to claim 3 wherein the third non-single-crystalline semiconductor layer contains 0.01 to 3 mol % of Sb, As, or P as an N type impurity.

5. A light energy conversion system according to claim 3 wherein the sixth non-single-crystalline semiconductor layer contains 0.01 to 3 mol % of In, Ga, or Al as a P type impurity.

6. A light energy conversion system according to claim 1 or 2 wherein the first and second electrolytic solutions contained in the first and second cells of the redox reaction chamber are of different kinds.

7. A light energy conversion system according to claim 6 which further comprises first and second electrolytic solution inlet mean for introducing the first and second electrolytic solutions of different kinds into the first and second cells of the redox reaction chamber, and first and second electrolytic outlet means for withdrawing the first and second electrolytic solutions from the first and second cells.

8. A light energy conversion system according to claim 1 or 2 wherein the first and second electrolytic solutions contained in the first and second cells of the redox reaction chamber are of the same kind.

9. A light energy conversion system according to claim 8 which further comprises first and second electrolytic solution inlet means for introducing the first and second electrolytic solutions of the same kind into the first and second cells of the redox reaction chamber, and first and second electrolytic solution outlet means for withdrawing the first and second electrolytic solutions from the first and second cells.

10. A light energy conversion system according to claim 8 wherein the first and second electrolytic solutions each include a nonaqueous solvent consisting of acetonitrile or propylene carbonate and, as an electrolyte, a complex salt including dipyridyl or phenanthroline and metal ions.

11. A light energy conversion system according to claim 10 wherein the metal ions included in the electrolyte are iron, ruthenium, or osmium ions.

12. A light energy conversion system according to claim 10 wherein the electrolyte is $MR_3X_2$ where M is iron, ruthenium, or osmium, R is dipyridyl or phenanthroline, ahd X is $ClO_4$.

13. A light energy conversion system according to claims 1 or 2 which further comprises first and second leads connected to the first and second electrodes respectively.

* * * * *